United States Patent [19]
Tanaka

[11] 3,824,607
[45] July 16, 1974

[54] SHUTTER OPERATING APPARATUS FOR CAMERA

[75] Inventor: Harumi Tanaka, Kobe, Japan

[73] Assignee: Minolta Camera Kabushiki Kaisha, Osaka, Japan

[22] Filed: May 9, 1973

[21] Appl. No.: 358,792

[30] Foreign Application Priority Data
May 30, 1972 Japan................................ 47-54085

[52] U.S. Cl..................... 354/50, 354/247, 354/266
[51] Int. Cl........................... G03b 9/40, G03b 9/62
[58] Field of Search......... 95/55, 56, 10 CT, 53 EA, 95/53 EB

[56] References Cited
UNITED STATES PATENTS

| | | | |
|---|---|---|---|
| 3,082,673 | 3/1963 | Takahama | 95/55 |
| 3,191,511 | 6/1965 | Burgarella et al. | 95/55 |
| 3,228,315 | 1/1966 | Platt | 95/55 |

*Primary Examiner*—Joseph F. Peters
*Attorney, Agent, or Firm*—Wolder & Gross

[57] ABSTRACT

An apparatus comprising a sector opening and closing member for opening and closing sectors by reciprocal pivotal movement, a sector driving member movable forward by a shutter release action and backward by a shutter cocking action and engageable with the sector opening and closing member during the forward movement to move the opening and closing member pivotally, and a movable member supporting the driving member to shift the driving member upon the shutter release action to a position where the driving member is engageable with the opening and closing member, before the driving member is initiated into operation. Prior to the return of the sector driving member to its cocked position during the shutter cocking operation, the returning movement of the movable member brings the sector driving member to a position where it is free of engagement with the sector opening and closing member.

14 Claims, 16 Drawing Figures

PATENTED JUL 16 1974

SHUTTER OPERATING APPARATUS FOR CAMERA

BACKGROUND OF THE INVENTION

The present invention relates to a shutter operating apparatus for cameras, especially for ultraminiature cameras employing 16 mm. (five-eighths in.) roll film.

As a shutter operating apparatus most suitable for ultra-miniature cameras using a film of a small size such as 16 mm. roll film, an apparatus has heretofore been known which comprises a sector opening and closing member adapted for reciprocal pivotal movement to open and close the sectors and a sector driving member to be moved forward by a shutter release action to kick the opening and closing member and to thereby drive the opening and closing member reciprocally privotally.

With the shutter operating apparatus of this type, it is essentially required that the sector driving member kick the sector opening and closing member to operate the shutter as described above, so that an engaging portion of the sector driving member engageable with the sector opening and closing member and a driven projection formed on the sector opening and closing member to be engaged by the engaging portion are adapted for a predetermined depth or degree of engagment. (i.e. overlapping at the time of engagement.) Accordingly, to return the sector driving member to its cocked position by a shutter cocking action, the engaging portion of the driving member must move over the driven projection during the returning movement so as not to rotate the sector opening and closing member.

Thus the shutter operating apparatus of the type described needs an additional force to pass the engaging portion over the driven projection during the shutter cocking action and is not fully adapted for smooth operation for this purpose. Moreover, the sector driving member must be made of an elastic material so as to be elastically flexed when passing over the projection and must be supported by a strong construction, or the apparatus must be of such construction that the sector driving member is shiftable on its support to a position where it can pass over the projection, the driving member being returnable to the normal position upon completion of the shutter cocking action. Such construction therefore renders the sector driving member and its support complex, is susceptible to malfunctions and results in an increase in cost.

Furthermore, during the passing over movement, a component of the moving force tends to act on the sector opening and closing member to operate the member inadvertently, resulting in an accident that the shutter will be tripped to expose the film during transport.

SUMMARY OF THE INVENTION

An object of this invention is to provide a shutter operating apparatus of the type described which incorporates a movable member for altering the position where the sector driving member operates at the time of shutter release and shutter cocking so as to eliminate the need for the sector driving member to pass over the sector opening and closing member during the shutter cocking operation.

Another object of this invention is to provide an apparatus in which the depth or degree of engagement of the sector driving member with the sector opening and closing member for a shutter tripping operation is varied is proportion to the proper amount of exposure so as to give a proper exposure opening.

Another object of this invention is to provide an apparatus in which a member for altering the position of the sector driving member at the time of shutter release by an amount corresponding to the proper amount of exposure and for shifting the member to a position where the member will not engage the sector opening and closing member at the time of shutter cocking controls the shutter opening movement of the sector opening and closing member to give an exposure opening of accurate size corresponding to the proper value of exposure.

Another object of this invention is to provide an apparatus in which the movable member effects a shutter opening operation for a long-time exposure or bulb exposure.

Another object of this invention is provide an apparatus capable of effecting a shutter tripping operation in corresponding relation to a proper amount of exposure even when the shutter button is relieved of a depressing force immediately after the depression of the button.

Still another object of this invention is to provide an electronic shutter for controlling the shutter opening and closing operation by an electromagnet in which the electromagnet is adapted to be energized for the shortest possible period of time for a bulb exposure so as to minimize the consumption of the power source battery.

According to this invention, the sector driving member or a substitute therefor is provided on a movable member which is shiftable when the shutter is opened and closed and when it is cocked. The movable member is actuated by a shutter release action and brought to a position where an engaging portion of the sector driving member for the sector opening and closing member is engageable with a driven projection of the opening and closing member, and the sector driving member is then released into operation from its cocked position to reciprocally pivotally move the sector opening and closing member.

To cock the shutter, the movable member is first brought to a shutter cocking position and retained in this position during the first half of the operation. This movement alters the track of movement of the sector driving member. During the second half of the shutter cocking operation which further continues after the completion of movement of the movable member, the sector driving member is returned to and latched at its cocked position.

Thus, the sector driving member has the track of its movement altered for the forward movement and backward movement. It comes into engagement with the sector opening and closing member only during the forward movement and is allowed to move backward toward the cocked position without interfering with the sector opening and closing member. This simplifies the sector driving member and the support construction therefor and eliminates such accident that the shutter will open inadvertently during the shutter cocking operation.

The movable member may be moved manually or automatically as desired. For the shutter release operation, it is possible to move the movable member slowly under the control of braking means such as a governor.

By slowing down the movement of the movable member for the shutter release action by braking, the depth or degree of the engagement of the sector driving member with the sector opening and closing member can be varied in proportion to the proper amount of exposure as determined by means for measuring the brightness of subject (i.e. light measuring means) that is incorporated in the camera so as to control the shutter opening and closing operation.

More specifically, the initiation of shutter release operation brings the movable member into a slow motion simultaneously therewith to progressively alter the position of the sector driving member. The sector driving member, although shifted in this way, is latched in its cocked position against movement, but upon lapse of the time of CR time constant of the light measuring means, an actuating member which has been retaining the driving member at its cocked position is initiated into operation by an electromagnet controlled by the CR time constant circuit to free the driving member, whereupon the driving member is brought into a rapid motion to move the sector opening and closing member reciprocally pivotally.

The sector driving member and the sector opening and closing members are so designed that the longer the time that elapses after the actuation of the movable member until the actuating member is initiated into operation, the greater will be the depth of engagement in proportion to the increase in the displacement of the movable member. The size of exposure opening defined by the sectors increases with the increase in the depth of engagement in proportion thereto. Consequently, the shutter operating mechanism serves as an electronic shutter of the program type by which the amount of exposure is varied automatically in proportion to the brightness of the subject.

In operative relation to the slow motion of the movable member, the opening movement of the sector opening and closing member alone can be effected by the movable member, and the sector driving member operates the sector opening and closing member for the closing action. This construction provides a slow opening shutter.

Other objects and features of this invention will become more apparent from the following description of the embodiments.

DESCRIPTION OF THE PREFERRED EMBODIMENTS

Figure 6:
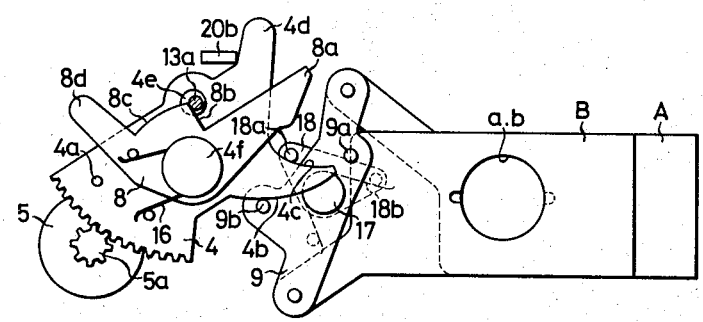
FIGS. 6 and 7 are views showing the apparatus of FIG. 2 to illustrate the movements of the members during a long-time exposure or bulb exposure in sequential order with some members omitted.
Figure 7:
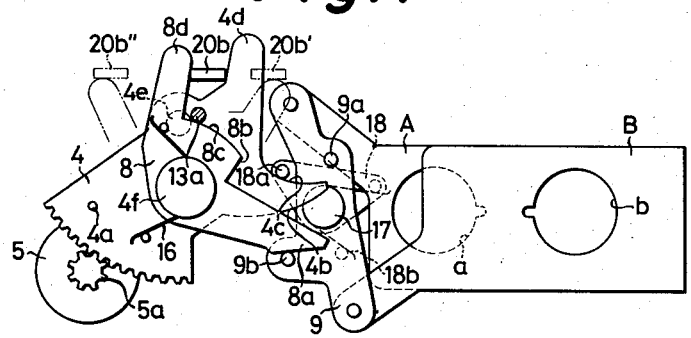
Figure 8:
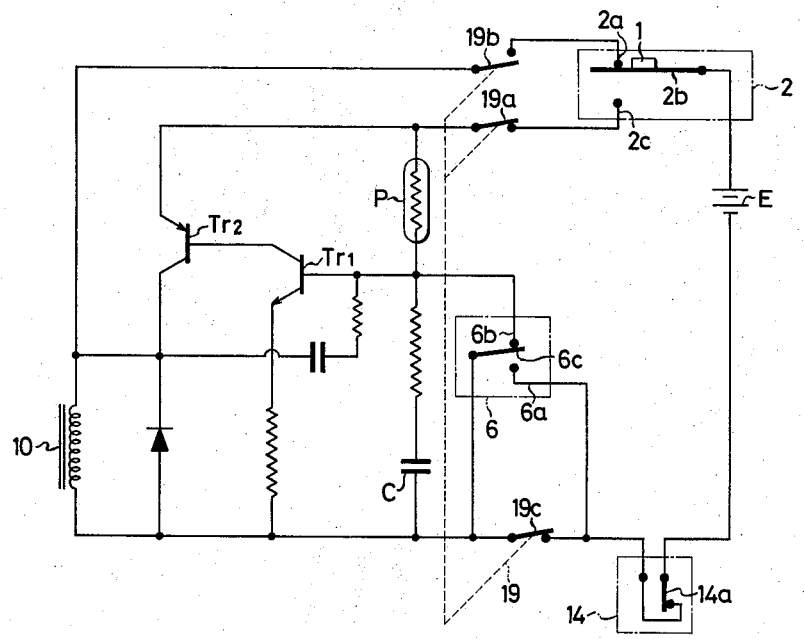
FIG. 8 is a diagram showing an example of exposure control electric circuit for the apparatus of FIG. 1.

FIGS. 1 to 7 show an embodiment in which a shutter button when depressed first actuates a light measuring circuit to energize an electromagnet upon lapse of the time of its time constant, whereby selectors are operated. An example of exposure time control electric circuit therefor is shown in FIG. 8.

Figure 1:
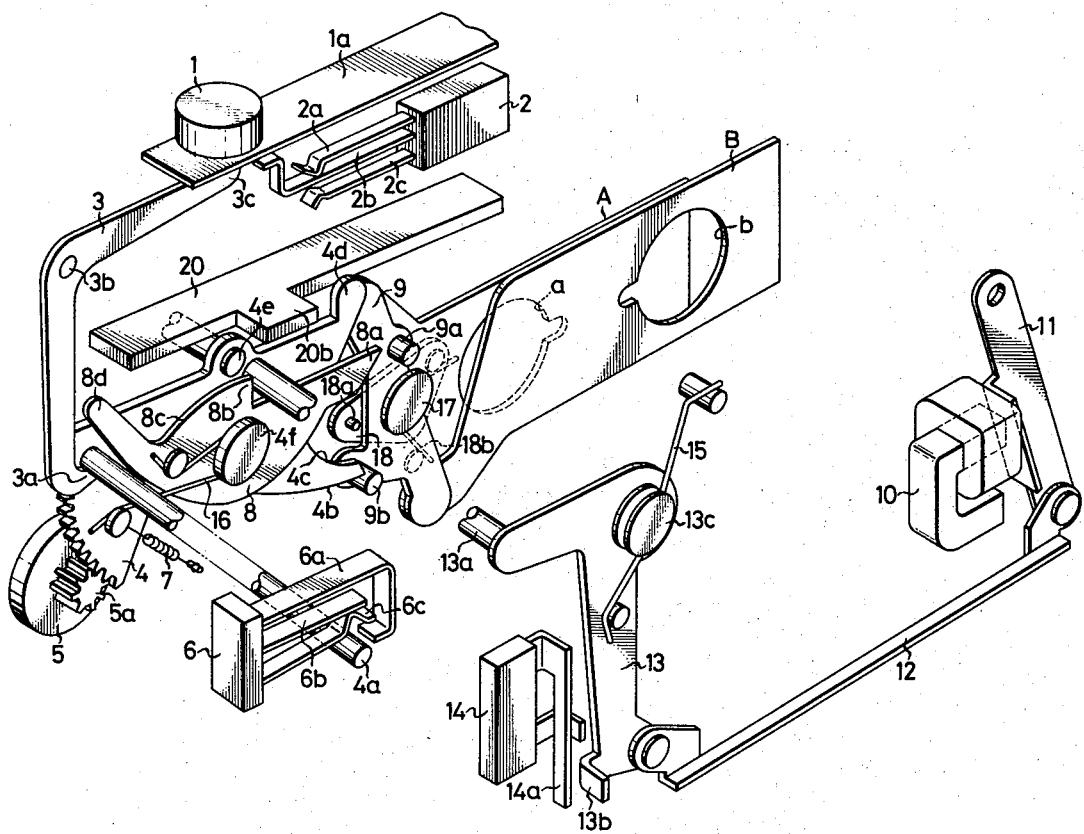
FIG. 1 is a perspective view showing the principal part of an embodiment of this invention in exploded state.
Figure 2:
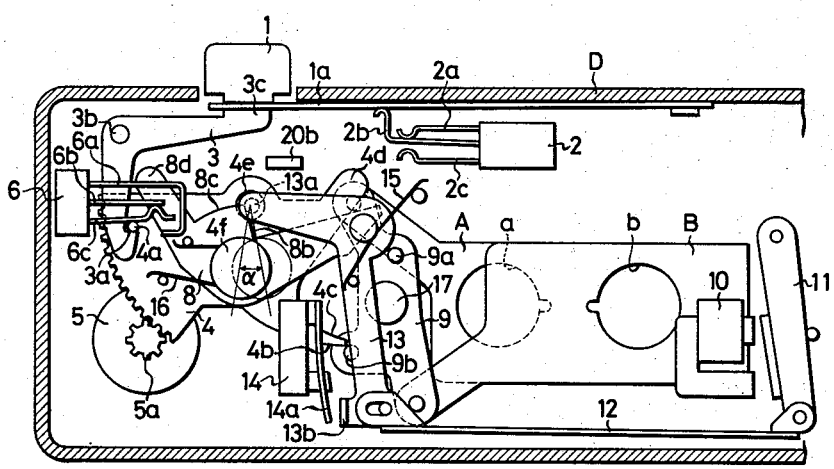
FIG. 2 is a front view showing the principal part of the embodiment of FIG. 1 when the shutter has been completely cocked.

FIG. 1 is an exploded perspective view showing the principal parts of the embodiment and FIG. 2 shows the same when the shutter is in its completely cocked position.

Figure 3:
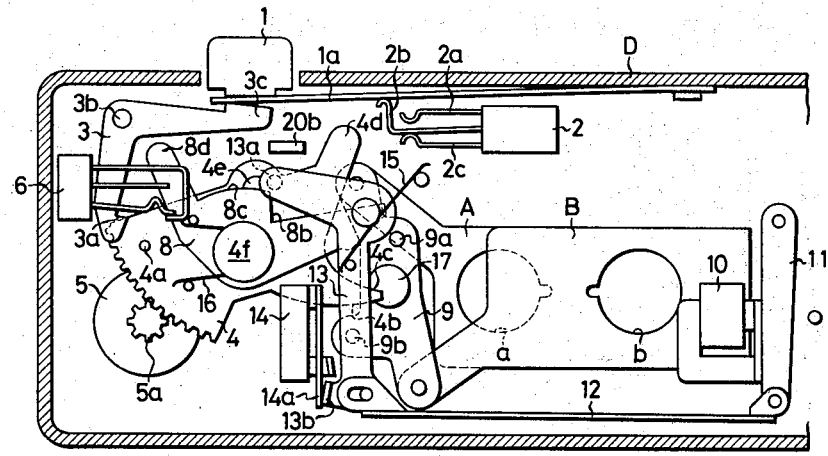
FIG. 3 is a view showing the same immediately after the sector driving member has been initiated into operation.

With reference to the drawings, a shutter button 1 is fixedly supported on the free end of an elastic plate 1a secured at the other end to a camera body D. The shutter button is biased upward by the elastic plate 1a with its upper end exposed from the camera body. In contact with the under face of the elastic plate 1a are the movable contact member 2b of a power source switch 2 for an exposure control electric circuit and the driven portion 3c of a release lever 3. As shown in FIG. 3, depression of the shutter button 1 causes the elastic plate 1a to move the movable contact member 2b of the power source switch 2 out of contact with a stationary contact member 2a into contact with another stationary contact member 2c to close the switch 2. At the same time, the plate 1a moves the release lever 3 in a clockwise direction about its pivot 3b.

While the shutter is in its cocked position, the release lever 3 has its hooked lower end 3a engaged with a latch pin 4a on a sector gear 4 serving as a movable member to retain the gear 4 in its cocked position, whereas the shutter button 1 when depressed frees the engagement to release the sector gear 4 from the cocked position.

The sector gear 4 is supported by a pivot 4e on the camera body D and is biased in a counterclockwise direction by a spring 7 with its teeth in engagement with a pinion 5a on a governor 5. When released from the cocked position, the sector gear 4 rotates slowly about the pivot 4e in a counterclockwise direction under the action of the spring 7 which is controlled by the governor 5.

While the sector gear 4 is retained in its cocked position, the movable contact member 6c of the count switch 6 for triggering the exposure control circuit is held in contact with a stationary contact member 6b by the latch pin 4a. The latch pin 4a permits the contact member 6c to move out of contact with the contact member 6b when the sector gear 4 is initiated into the counterclockwise movement. Accordingly, in the exposure time control circuit shown in FIG. 8 wherein the power source switch 2 has already been closed, the release of the contact member 6c from the contact member 6b actuates a light measuring integration circuit comprising a photocell P and a capacitor C to initiate an exposure time controlling operation as already known.

The sector gear 4 further carries a sector driving lever 8 pivoted by a pin 4f thereon and biased by a spring 16 in a clockwise direction on the gear 4. The pin 4f about which the lever 8 is pivotally movable is spaced apart by a suitable distance from the pivot 4e which is the center of rotation of the sector gear 4. The slow rotation of the sector gear 4 therefore moves the pin 4f along a circle having its center at the pivot 4e and having a radius corresponding tp the above-mentioned distance as shown in a phantom line in FIG. 2, the displacement of the pin 4f corresponding to the angle α of rotation of the sector gear 4.

As seen in FIG. 3, the sector driving lever 8 has an arm 8a which is so positioned that by virtue of an action to be described later it will come into contact with a sector opening pin 9a on a lever 9 for opening and closing the sectors to move the lever 9 pivotally. The degree of engagement of the arm 8a with the sector opening pin 9a varies depending upon the displacement of the pin 4f to determine the amount of opening of the sectors in corresponding relation to the variation.

The sector opening and closing lever 9 is pivoted to a pin 17 on the camera body D for reciprocal pivotal movement which imparts pivotal movement to the sectors A and B having openings a and b which are symmetric to each other in shape and make an exposure for an unillustrated film when overlapping. As already described, the amount of the opening corresponds to the displacement of the pin 4f.

The opening and closing lever 9 is reciprocally pivotally moved by the clockwise movement of the sector driving lever 8 effected by means to be described later. The sector opening and closing lever has thereon the sector opening pin 9a and a sector closing pin 9b. When the sector driving lever 8 is initiated into operation to turn in a clockwise direction under the action of the spring 16, the arm 8a contacts the sector opening pin 9a as indicated in the phantom line in FIG. 5 to move the pin 9a out of track of pivotal movement of the arm 8a and to thereby turn the sector opening and closing lever 9 in a clockwise direction, sliding the sectors A and B in directions to overlap the openings a and b each other. Through further pivotal movement of the sector driving lever 8, the arm 8a moves past the sector opening pin 9a, whereby the forward (i.e. clockwise) rotation of the lever 9 is completed. Subsequently, the arm 8a comes into contact with the sector closing pin 9b as shown in the solid line in FIG. 5, pushing the pin 9a to turn the sector opening and closing lever 9 in a backward direction (i.e. counterclockwise direction), whereby the sectors A and B are slidingly moved in directions opposite to the foregoing to close the shutter.

It will be apparent from the description above that the greater the angle α of rotation of the sector gear 4, the greater will be the displacement of center of rotation of the sector driving lever 8. Consequently, the longer the time that elapses after the depression of the shutter button 1 until the sector driving lever 8 is initiated into operation, the larger will be the exposure opening given by the operation described.

The actuation of the sector driving lever 8 is effected by energization of an electromagnet 10.

Upon lapse of the time of CR time constant corresponding to the intensity of light impinging on the photocell P from the subject after the light measuring integration circuit has been energized, a switching circuit comprising a trasistors $Tr_1$ and $Tr_2$ functions as already known to supply current to the electromagnet 10 from the power source E to magnetize the same. When thus energized, the electromagnet 10 attracts an attraction piece 11, which therefore causes a link 12 to turn an actuating lever 13 in a clockwise direction against a spring 15.

The actuating lever 13 is pivoted to a pin 13c on the camera body D and is biased in a counterclockwise direction by the spring 15 in the direction to force the attraction piece 11 away from the electromagnet 10. The lever 13 has an arm carrying a latch pin 13a which is in engagement with a stepped portion 8b of the sector driving lever 8 while the shutter is in its tensioned state as seen in FIG. 2 to retain the lever 8 in its cocked position. Energization of the electromagnet 10 turns the lever 13 in a clockwise direction as seen in FIG. 3 to disengage the latch pin 13a from the stepped portion 8b and position the pin above an arcuate edge 8c continuous with the stepped portion 8b of the driving lever 8. The arcuate edge 8c is defined by a segment of circle having its center at the pin 4f.

In this way the sector driving lever 8 is forced into rapid clockwise rotation by the spring 16 to move the lever 9 reciprocally pivotally to open and close the shutter.

The clockwise rotation of the actuating lever 13 causes a lug 13b at its lower end to push a movable contact member 14a of a circuit switch 14 to interrupt the supply of current to the electromagnet 10, whereupon the magnet frees the attraction piece 11 from its attraction, but the rotation of the sector driving lever 8 permits the latch pin 13a to remain in engagement with the arcuate edge 8c, with the result that in spite of the action of the spring 15 the actuating lever 13 is prevented from returning in a counterclockwise direction to keep the switch 14 open.

While the latch pin 13a of the actuating lever 13 is in engagement with the stepped portion 8b of the sector driving lever 8 to retain the driving lever 8 in its cocked position, depression of the shutter button 1 rotates the sector gear 4 to slowly displace the center of rotation of the sector driving lever 8. However, the latch pin 13a in the engaged state is positioned substantially in alignment with the pivot 4e serving as the center of rotation of the sector gear 4 so as to eliminate errors in the position and state of engagement of the pin 13a with the stepped portion 8b of the lever 8 due to the displacement of the pivot 4f of the sector driving lever 8. This prevents an inadvertent disengagement of the pin 13a from the stepped portion.

To accurately control the size of the exposure opening produced by the foregoing operation of the sectors A and B, the sector gear 4 is provided with a cam portion 4b.

Figure 5:
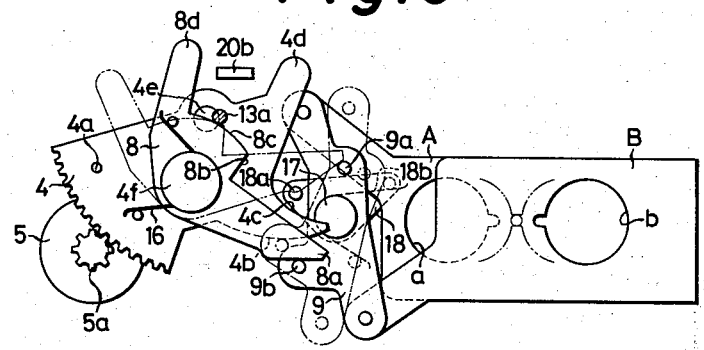

In order to permit the sector opening action effected by the clockwise rotation of the sector driving lever 8 to give the desired exposure aperture in corresponding relation to the degree of the engagement of the opening pin 9a with the arm 8a of the sector driving lever 8, the mechanism is so designed that when the sector opening and closing lever 9 has been rotated to the position indicated for example in the phantom line in FIG. 5 with the arm 8a rendered movable to pass the position of the opening pin 9a, the sector closing pin 9b on the lever 9 is in contact with the cam portion 4b to prevent further rotation of the lever 9 in the sector opening direction and to thereby give an exposure aperture of proper size corresponding to the CR time constant time.

The arm 8a which has passed the position of the sector opening pin 9a subsequently comes into contact with the sector closing pin 9b to close the sectors to complete a photographing operation as already described.

Figure 4:
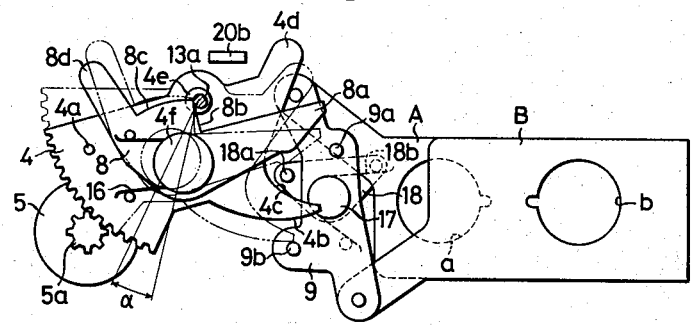
FIGS. 4 and 5 are views showing the apparatus of FIG. 2 to illustrate the movements of the respective members during an automatic exposure operation in sequential order, some members being omitted for clarification.

The foregoing description has been give for a shutter operation corresponding to the time of CR time constant of the light measuring integration circuit. The shutter will operate at a high speed in the following manner when the subject is sufficiently bright. Depresssion of the shutter button 1 in the cocked state of FIG. 2 initiates the sector gear 4 into rotation to cause the circuit to start the light measuring operation. The sector gear 4 rotates from the phantom line position to the solid line position in FIG. 4 through the angle α corresponding to the CR time constant time. When the sector gear 4 has reached the solid line position of FIG. 4, the electromagnet 10 is energized as seen in FIG. 3 to operate the actuating lever 13 as shown in FIG. 3, turning the sector driving lever 8 from the phantom line position to the solid line position in FIG. 5, whereby the sector opening and closing lever 9 is reciprocally pivotally moved over the range from the solid line position to the phantom line position to open and close the shutter. As already described, the angle α varies with the CR time constant time and the operations illustrated in FIGS. 4 and 5 are given only for illustrative purposes. The longer the CR time constant time, the greater will be the angle α of rotation of the sector gear 4, hence the greater will be the aperture of the shutter.

To meet the situation wherein the subject is low in its brightness and requires a long exposure time, the sector gear 4 is formed with an arm 4c. There is further provided a sector opening lever 18 serving as a sector opening member and having a pin 18a with which the arm 4c comes into contact upon lapse of a predetermined constant time after the sector gear 4 has been initiated into slow rotation by the depression of the shutter button 1 as shown in FIG. 6.

The sector opening lever 18 is supported by the pin 17 the same as the sector opening and closing lever 9, and a spring 18b acts between the lever 9 and the lever 18 to bias the lever 18 in a counterclockwise direction.

When the sector gear 4 rotates slowly in a counterclockwise direction, permitting the arm 4c to come into contact with the pin 18a on the sector opening lever 18 before the electromagnet 10 is energized, the sector gear 4 pushes the sector opening lever 18 clockwise by the pin 18a, causing the spring 18b to rotate the sector opening and closing lever 9 in the same direction. Consequently, at the final position of rotation of the sector gear 4 (i.e. at the position of the greatest angle of rotation), the openings a and b of the sectors A and B come into register to give the largest exposure aperture as seen in FIG. 6.

When the exposure aperture reaches a maximum value and the CR time constant time of the light measuring integration circuit thereafter elapses, the sector driving lever 8 is freed from its cocked position to rapidly rotate in a clockwise direction. However, since the sector opening and closing lever 9 has already been driven by the sector gear 4 in the sector opening direction through the maximum angle of rotation, with the sector opening pin 9a moved out of track of rotation of the distal end of the arm 8a, the sector driving lever 8 clears the sector opening pin 9a and comes into direct contact with the sector closing pin 9b as seen in FIG. 7. Accordingly, although the sector opening lever 18 is prevented from counterclockwise rotation by the arm 4c of the sector gear 4, the sector opening and closing lever 9 is driven in a counterclockwise direction against the action of the spring 18b to close the shutter for completion of exposure.

In the case where a subject of medium brightness is photographed such that while the sector gear 4 slowly rotating under the control of the governor 5 causes the sector opening lever 18 to move the sector opening and closing lever 9 in the sector opening direction before the energization of the electromagnet 10, the electromagnet 10 is energized upon lapse of the time of the constant time of the light measuring integration circuit to initiate the sector driving lever 8 into action, the sector driving lever 8 thus actuated comes into contact with the sector opening pin 9a on the sector opening and closing lever 9 which is rotating in the sector opening direction, quickly rotating the opening and closing lever 9 to open out the slowly enlarging exposure opening to a size corresponding to the time of the constant time. The lever 8 then contacts the sector closing pin 9b to quickly return the sector opening and closing lever 9 in the sector closing direction for completion of exposure.

These operations will further be described with reference to FIG. 9. When a bright subject is photographed, the sector gear 4 is moved and, upon lapse of the CR time constant time determined by the light measuring integration circuit, the sector driving lever 8 is actuated by the energization of the electromagnet 10 to start a sector opening operation at point $t_1$ in FIG. 9 and give the film an amount of exposure $T_1$ represented by a hatched area corresponding to the time constant time. The sectors are closed at point $t_{1s}$.

Figure 9:
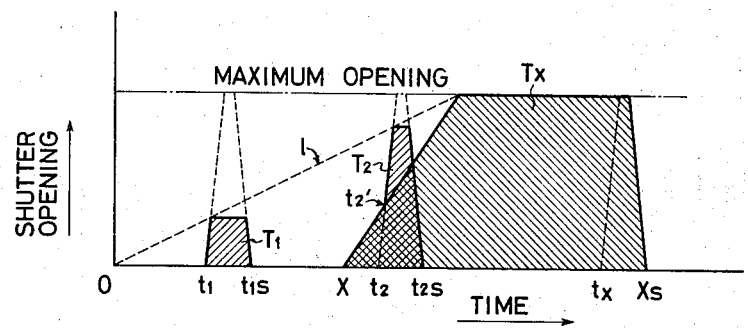
FIG. 9 is a graph showing variations of amount of exposure according to this invention.

For a long-time exposure, the sector gear 4 comes into engagement with the sector opening lever 18 at point X in FIG. 9 after the actuation of the sector gear 4 to progressively open the sectors. After giving a maximum aperture, the light measuring integration circuit functions to energize the electromagnet 10 at point $t_x$ and actuate the sector driving lever 8, which therefore closes the sectors at point $X_s$, giving an amount of exposure $T_x$ correspoinding to a hatched area.

When the sectors are initiated into an opening action by the engagement of the sector gear 4 with the sector opening lever 18 at the point X to gradually enlarge the exposure aperture and the light measuring integration circuit energizes the electromagnet 10 in the course of the opening action, the sector driving lever 8 starts to move at point $t_2$ in the Figure. At point $t_2'$ the arm 8a of the lever 8 contacts the sector opening pin 9a on the lever 9 to quickly open the sectors, giving the film an amount of exposure $T_2$ represented by a hatched area corresponding to the time of the time constant. The sectors are closed at point $t_{2s}$ in the Figure.

Thus by suitably determining the timing for the arm 4c of the sector gear 4 to come into engagement with the pin 18a on the sector opening lever 18, namely the point X where the arm 4c initiates the sector opening action, a slow opening shutter can be provided which utilizes the delaying action of the governor 5.

The broken line $l$ in FIG. 9 represents the value of the exposure opening determined by the control of the cam 4b and corresponding to the angle $\alpha$ of rotation of the sector gear 4 which varies with time.

Bulb exposure operation will now be described. A bulb changeover switch 19 of the electric circuit shown in FIG. 8 is closed at a bulb contact terminal. Usually, the switch 19 is manually operated to close the circuit of its movable contact member 19b and to open those of movable contact members 19a and 19c.

Depression of the shutter button 1 in this state moves the movable contact member 2b of the power source switch 2 out of contact with the stationary contact member 2a into contact with the stationary contact member 2c. However, since the contact member 19a of the switch 19 is off, the light measuring integration circuit does not operate.

On the other hand, the sector gear 4 unlatched from the release lever 3 slowly rotates in a counterclockwise direction under the control of the governor 5, moving the movable contact member 6c of the count switch 6 to close the contact 6a upon initiation of the rotation, in preparation for the supply of current to the electromagnet 10 upon the return of the shutter button 1. As already described, the sector gear 4 causes its arm 4c to actuate the sector opening lever 18 at the point X in FIG. 9 and thereby progressively open the sectors, giving a maximum opening upon lapse of a certain period of time.

After the film has been given a required amount of exposure, the shutter button 1 is freed from the depression, whereupon the button 1 returns upward under the action of the elastic plate 1a, permitting the movable contact member 2b of the power source switch 2 to leave the contact member 2c to close the contact member 2a. This energizes the electromagnet 10, initiating the sector driving lever 8 into operation to close the sectors as seen in FIG. 7.

Upon completion of the closing operation described, the sector driving lever 8 depresses the sector closing pin 9b to retain the sector opening and closing lever 9 at the sector closing position. In this way the lever 8 also serves to prevent inadvertent opening of the sectors in the closed state.

The apparatus described is therefore adapted to operate the shutter by supplying current to the electromagnet 10. To cock the shutter after the shutter operation, a cocking plate 20 shown in the foregoing drawings is pivotally moved leftward and rightward as indicated in phantom lines in FIG. 7.

Figure 10:
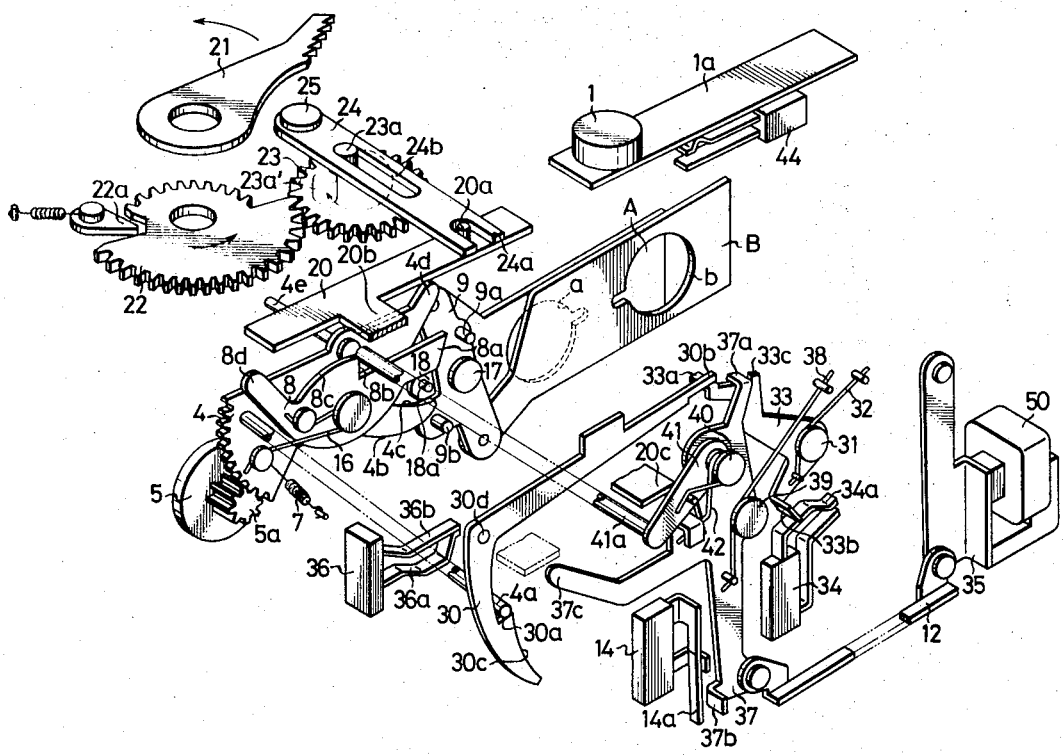
FIG. 10 is a perspective view showing the principal part of another embodiment of this invention in exploded state.

As shown in FIG. 10 for example, the mechanism for pivotally moving the cocking plate 20 comprises a cocking gear 23 adapted for clockwise rotation in operative relation to a film winding operation (in a counterclockwise direction) of a winding lever 21 by means of a ratchet 22 and carrying a pin 23a thereon, and a pivotal lever 24 supported at its one end on a pin 25 and formed with a slot 24b in which the pin 23a engages. The lever 24 has a bifurcated end 24a receiving therein a pin 20a on the cocking plate 20. The cocking plate 20 is supported by unillustrated support means on the camera body so as to be movable leftward and rightward.

When the cocking gear 23 is driven in a clockwise direction by a film winding operation, the pivotal lever 24 moves pivotally rightward, forcing the cocking plate 20 rightward, with the result that a projection 20b of the plate 20 pushes a driven portion 4d of the sector gear 4 to rotate the gear 4 in a clockwise direction to the position of a phantom line 20b' in FIG. 7 while tensioning the spring 7. The sector gear is therefore returned to its cocked position shown in FIG. 2, with the latch pin 4a brought into engagement with the hooked end 3a of the release lever 3, whereby the gear is retained in its cocked position.

This causes the movable contact member 6c of the count switch 6 to move out of contact with the stationary contact member 6a into contact with the stationary contact member 6b. When the sector gear 4 is returned to the cocked position, the distal end of its cam portion 4b is positioned on the sector closing pin 9b of the sector opening and closing lever 9 to prevent the rotation of the lever 9.

Subsequently, the pivotal lever 24 is pivotally moved leftward to move the cocking plate 20 leftward, which in turn pushes the driven portion 8d of the sector driving lever 8 with its projection 20b. The lever 8 therefore rotates in a counterclockwise direction while compressing the spring 16. At this time, the pin 4f that is the center of rotation of the sector driving lever 8 has been returned to the position prior to the shutter release by virtue of the return of the sector gear 4 to the cocked position. During the counterclockwise rotation of the sector driving lever 8, the tip of its arm 8a passes the left side of the sector opening pin 9a on the lever 9 without contacting the pin 9a. Consequently, the sector driving lever 8 is pushed to its cocked position indicated in a phantom line 20b'' in FIG. 7. As shown in FIG. 2, the latch pin 13a on the actuating lever 13 biased by the spring 15 in a counterclockwise direction shifts from the arcuate edge 8c to the stepped portion 8b to retain the lever 8 in its cocked position.

The movement of the actuating lever 13 releases the attraction piece 11 from the electromagnet 10 to close the circuit switch 14. Although the sector opening lever 18 has been retained, against the action of the spring 18b, by the arm 4c of the sector gear 4 upon a long-time or bulb exposure making operation, at the position where the sector opening action is terminated, the return of the sector gear 4 to the cocked position permits the lever 18 to return to the original position under the action of the spring 18b.

It will be apparent from the foregoing description that the shutter release action first rotates the sector gear 4 to shift the pin 4f serving as the center of rotation of the sector driving lever 8 and to give a degree of the engagement of the lever 8 with the sector opening and closing lever 9 corresponding to the time of CR time constant (proper amount of exposure) determined by the action of the light measuring integration circuit or to give a long-time exposure operation for the operation of the sector opening and closing lever 9. For the shutter cocking operation subsequent to the closing of the exposure opening, the sector gear 4 is operated first and is latched at its cocked position, permitting the center of rotation of the sector driving lever 8 to return to the position assumed prior to the shutter release action. The sector driving lever 8 is thereafter brought to its cocked position. Accordingly, during the return of the lever 8 to the cocked position, the lever 8 remains out of engagement with the sector opening and closing lever 9. Moreover, since the return of the sector driving lever 8 is effected while the sector opening and closing lever 9 is retained against clockwise rotation by the cam portion 4b of the sector gear 4, it is assure that the sectors will not be opened inadvertently during the shutter cocking operation.

Inasmuch as the sector gear 4 carries thereon the pin 4f supporting the sector driving lever 8, the sector gear 4 serves as a member for shifting the center of rotation of the driving lever 8 to achieve the intended object.

Further description will be given with reference to FIGS. 10 to 14 showing an embodiment in which an energized electromagnet is deenergized to operate the shutter.

Figures 11, 12:
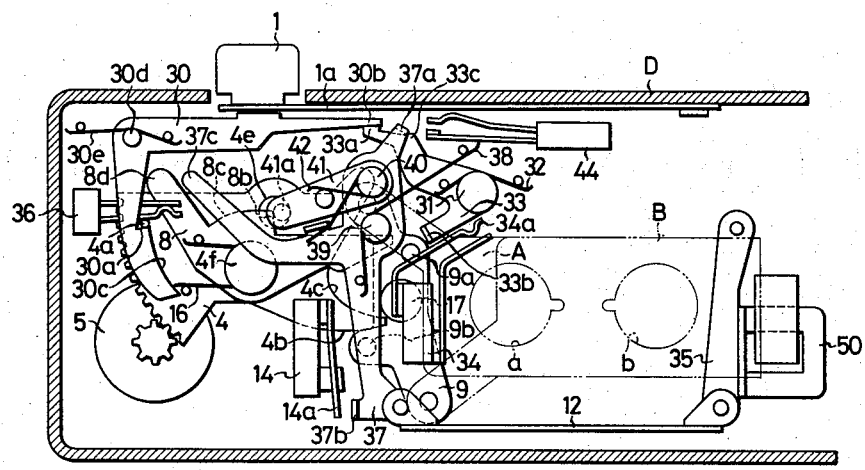
FIG. 11 is a front view showing the principal part of the apparatus of FIG. 10 when the shutter has been completely cocked.
FIG. 12 is a view showing the same immediately after the movable member has been released from its cocked position.

FIG. 10 shows the principal parts of the embodiment in exploded state, and FIG. 11 shows the embodiment of FIG. 10 when the shutter is completely cocked.

Depression of a shutter button 1 causes an elastic plate 1a to pivotally move a release lever 30 in a clockwise direction as seen in FIG. 12, the lever 30 being supported by a pin 30d.

As is the case with FIG. 1, the release lever 30 when in the cocked position has its hooked portion 30a engaged with a latch pin 4a on a sector gear 4 to retain the gear 4 in its cocked position with its tail end 30b positioned on the driven end 33a of a switch lever 33 supported by a pin 31 and biased by a spring 32 in clockwise direction.

The release lever 30 when driven in a clockwise direction rotates the switch lever 33 in a counterclockwise direction. The switch lever 33 has a tail end 33b positioned close to the movable contact member 34a of an electromagnetic switch 34 and, when rotated as above, the lever 33 closes the electromagnetic switch 34 as shown in FIG. 12 and supplies current to the winding of an electromagnet 50 to energize the magnet as illustrated in the electric circuit of FIG. 14. Upon shutter cocking, the electromagnet 50 fixedly attracts an attraction piece 35 positioned close to its attracting face.

Through the foregoing movement, the hooked portion 30a of the release lever 30 releases the latch pin 4a of the sector gear 4, so that the sector geae 4 starts to move in a counterclockwise direction under the action of the spring 7 while being controlled by a governor 5. At the same time, the latch pin 4a separates the movable contact member 36a of a count switch 36 from its stationary contact member 36b as seen in FIG. 12 to trigger the light measuring integration circuit comprising a photocell P and a capacitor C.

The release lever 30 is further formed with an arcuate edge 30c continuous with its hooked portion 30a and adapted for sliding contact with the latch pin 4a when the latch pin 4a moves. Thus during the rotation of the sector gear 4, the pin 4a slides along the arcuate edge 30c in contact therewith as seen in FIG. 12. Thus even when the button 1 is relieved of the depressing force and returns upward under the action of the elastic plate 1a, the release lever 30 is prevented by the latch pin 4a from counterclockwise rotation so as not to return to the position assumed prior to the shutter release, with the switch lever 33 retained to keep the switch 34 closed, the projection 33c of the lever 33 being held out of the track of rotation of the lug 37a of an actuating lever 37. As a result, in spite of the upward return of the shutter button 1, the integration circuit remains acting, with the electromagnet 50 energized.

Figure 13:
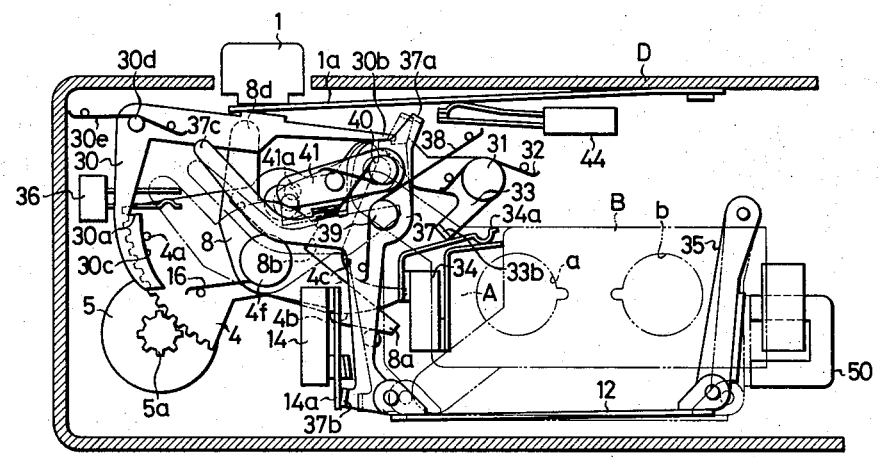
FIG. 13 is a view showing the movements of the members in FIG. 11.

When the voltage of charge in the capacitor C of the light measuring integration circuit reaches a predetermined level, the electromagnet 50 will be deenergized, so that the actuating lever 37 connected by a link 12 to the attraction piece 35 and pivoted by a pin 39 is driven by a spring 38 in a clockwise direction as seen in FIG. 13 to push a movable contact member 14a of a circuit switch 14 with its lower bent end 37b to open the switch 14.

The actuating lever 37 further carries a latch lever 41 pivoted to a pin 40 thereon. The lever 41 is urged in a counterclockwise direction by a spring 42 on the actuating lever 37. Extending from the latch lever 41 is a latch pin 41a which engages with the stepped portion 8b of a sector driving lever 8 as in the case with FIG. 1 to retain the driving lever 8 in its cocked position.

When the actuating lever 37 rotates in a clockwise direction upon deenergization of the electromagnet 50, the latch lever 41 follows the movement of the actuating lever 37 to shift from the stepped portion 8b of the sector driving lever 8 onto the arcuate edge 8c. Consequently, the driving lever 8 whose center of rotation, i.e. pin 4f, has been gradually shifted by the rotation of the sector gear 4 is rapidly driven by a spring 16 in a clockwise direction as shown in FIG. 13 to open and close the shutter.

The sector gear 4 and the sector driving lever 8 operate in the same manner as in FIG. 1. When the shutter operates at a high speed, namely when the subject to be photographed is bright, the rotational angle α of the sector gear 4 for that operation is small, hence a small degree of engagement of the arm 8a of the sector driving lever 8 with the sector opening pin 9a of a sector opening and closing lever 9 to give a small exposure opening by the reciprocal pivotal movement of the sector opening and closing lever 9.

Further if the shutter operates at a medium speed, the arm 4c of the sector gear 4 causes a sector opening lever 18 to start to progressively open an exposure aperture before the actuating lever 37 is initiated into operation. During the above-mentioned operation, the actuating lever 37 functions upon deenergization of the electromagnet 50 to free the sector driving lever 8 from its cocked position. The driving lever 8 therefore comes into contact with the sector opening pin 9a of the sector opening and closing lever 9 in the course of the sector opening operation to quickly open the sectors to form an exposure opening of the desired size. The lever 8 thereafter contacts the sector closing pin 9b to close the sectors for completion of exposure.

When the mechanism functions as a low-speed shutter, the arm 4c of the sector gear 4 causes the sector opening lever 18 to rotate the sector opening and closing lever 9 to the position of full exposure opening before the actuating lever 37 is initiated into operation. Subsequent deenergization of the electromagnet 50 permits the actuating lever 37 to operate as already described to function the sector driving lever 8, which in turn rotates the sector opening and closing lever 9 in a counterclockwise direction to close the exposure opening.

Figure 14:
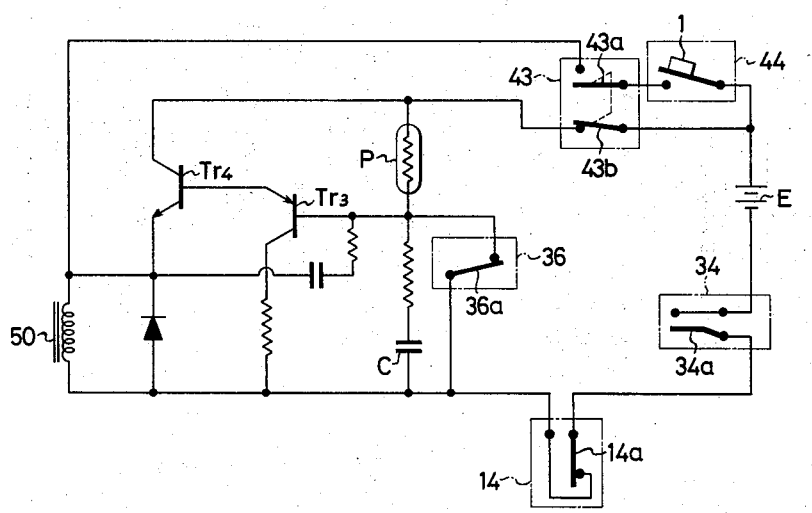
FIG. 14 is a diagram showing an example of exposure control electric circuit for the apparatus of FIG. 10.

For a bulb exposure, a bulb changeover switch 43 shown in FIG. 14 is operated to open the circuit (light measuring integration circuit) of a movable contact member 43b and to close a movable contact member 43a for the bulb. Disposed under the elastic plate 1a supporting the shutter button 1 is a power source switch 44 as illustrated. The switch 44 is closed by depression of the shutter button 1.

The depression of the shutter button 1, while the shutter is in its cocked position, closes the power source switch 44 and rotates the release lever 30 in a clockwise direction, causing the switch lever 33 to close the electromagnet switch 34, whereby the electromagnet 50 is energized to attract the attraction piece 35 to lock the actuating lever 37.

On the other hand, the release lever 30 frees the sector gear 4 from its cocked position, permitting the gear 4 to slowly rotate in a counterclockwise direction under the control of the governor 5. When the gear 4 has rotated a certain angle, the arm 4c starts to push the pin 18a of the sector opening lever 18. The lever 18 and sector opening and closing lever 9 therefore start to open the sectors to a full extent. After the lapse of a desired period of time, the shutter button 1 is released from the depressed position and is returned upward. This opens the power source switch 44 to deenergize the electromagnet 50, with the result that the spring 38 acts to rotate the actuating lever 37 in a clockwise direction, causing the latch lever 41 to move the sector driving lever 8, which in turn rotates the sector opening and closing lever 9 in a counterclockwise direction rapidly to close the sectors.

During the foregoing operation, the cam portion 4b of the sector gear 4 opposes the sector closing pin 9b on the lever 9 and, when the sectors have achieved an exposure opening of the desired size, the cam portion 4b engages the pin 9b to accurately determine the exposure opening size. Further the sector driving lever 8 depresses the closing pin 9b on the lever 9 and stops upon completion of the sector opening and closing action so as to prevent bounding of the associated members when the sectors are closed and to thereby eliminate the possibility of an exposure aperture opening again.

FIG. 12 shows the mechanism after the sector gear 4 has been initiated into counterclockwise rotation under the control of the governor 5 by the depression of the shutter button 1, and FIG. 13 shows the same when the sector opening and closing operation has been completed.

The shutter is cocked substantially in the same manner as in FIG. 1 by the counterclockwise rotation (winding operation) of the winding lever 21 shown in FIG. 10.

The cocking gear 23 is driven in a clockwise direction by a film winding operation through the ratchet 22. The pin 23a on the gear 23 moves from the solid line position to the broken line position 23a' as indicated in the broken line in FIG. 10. Upon completion of the winding operation, the gear 23 rotates in a counterclockwise direction to return the pin 23a to the original position. Indicated at 22a in the Figure is a pawl for preventing the reverse rotation of the ratchet 22 and the cocking gear 23 in the course of the winding operation. The pawl permits the ratchet 22 and the cocking gear 23 to return to the original position upon completion of the winding operation.

The rotation of the cocking gear 23 reciprocally pivotally moves the pivot lever 24 about the pin 25, sliding the cocking plate 20 leftward and rightward.

Upon initiation of the winding operation, the cocking plate 20 moves rightward first, causing its projection 20b to push the driven portion 4d of the sector gear 4, driving the gear 4 in a clockwise direction to tension the spring 7 and to shift the center 4f of rotation of the sector driving lever 8. This brings the latch pin 4a to the position of the hooked portion 30a of the release lever 30. Inasmuch as the lever 30 is urged by a spring 30e in a counterclockwise direction, the hooked portion 30a is engaged by the latch pin 4a, whereby the sector gear 4 is retained in its cocked position. At the same time, the latch pin 4a pushes the movable contact member 36a of the count switch 36 to close the switch 36.

The foregoing operation frees the switch lever 33 from the release lever 30, causing the spring 32 to return the lever 33 in a clockwise direction to open the electromangetic switch 34. As already described, the sector gear 4 brings the tip of the cam portion 4b onto the sector closing pin 9b on the lever 9, to hold the sectors in the closed state positively.

When the sector gear 4 is latched at the cocked position, the continuous winding operation starts to move the cocking plate 20 leftward. First, the end 20c of its projection pushes the driven arm 37c of the actuating lever 37 into counterclockwise rotation against the action of the spring 38, causing the lug 37a of the lever 37 to pass over the projection 33c of the switch lever 23 and to engage therewith, whereby the clockwise rotation of the actuating lever 37 is prevented. In this state, the latch pin 41a of the latch lever 41 is positioned on the arcuate edge 8c of the sector driving lever 8. Further the attraction piece 35, driven by the link 12 in a counterclockwise direction, is pressed against the attraction face of the electromagnet 50 or is shifted to a position in close proximity to the magnet. The attraction piece thus pressed against or positioned close to the attracting face of the electromagnet 50 can be fixedly attracted immediately upon the energization of the electromagnet 50 and makes it possible to employ a relatively low electromagnetic attraction for the saving of the magnetizing current.

Subsequent to the retention of the actuating lever 37 at the cocked position, the cocking plate further moves leftward, causing the projection 20b to push the driven portion 8d of the sector driving lever 8 to drive the lever 8 in a counterclockwise direction. Upon the lever 8 reaching its cocked position, the latch pin 41a which has been in sliding contact with the arcuate edge 8c of the lever 8 engages in the stepped portion 8b under the action of the spring 42, whereby the sector driving lever 8 acted on by the spring 16 is latched in its cocked position. In this latched state, the latch pin 41a is substantially in alignment with the pivot 4e of the sector gear 4 to eliminate errors in the latched position of the sector driving lever 8 during the rotation of the sector gear 4 for shutter release, just as is the case with the embodiment already described.

It is noted that the cocking of the sector gear 4 prior to the above-mentioned cocking action of the sector driving lever 8 has already shifted the center of rotation of the sector driving lever 8, i.e. pin 4f, away from the sector opening and closing lever 9, so that the end of arm 8a of the sector driving lever 8 when the lever 8 is to be cocked clears the sector opening pin 9a, eliminating the possibility of inadvertent opening of the sectors and assuring smooth cocking procedure.

Although the depression of the shutter button 1 for a shutter release action immediately rotates the switch lever 33 to cause the projection 33c to free the actuating lever 37 from engagement therewith, the electromagnet switch 34 has already been closed with the attraction piece 35 attracted to the magnet 50, so that the actuating lever 37 is prevented from inadvertent clockwise rotation to keep the sector driving lever 8 out of rotation.

Indicated at $Tr_3$ and $Tr_4$ are switching transistors which function when the capacitor C of the light measuring integration circuit has been charged to a given voltage level.

Figure 15:
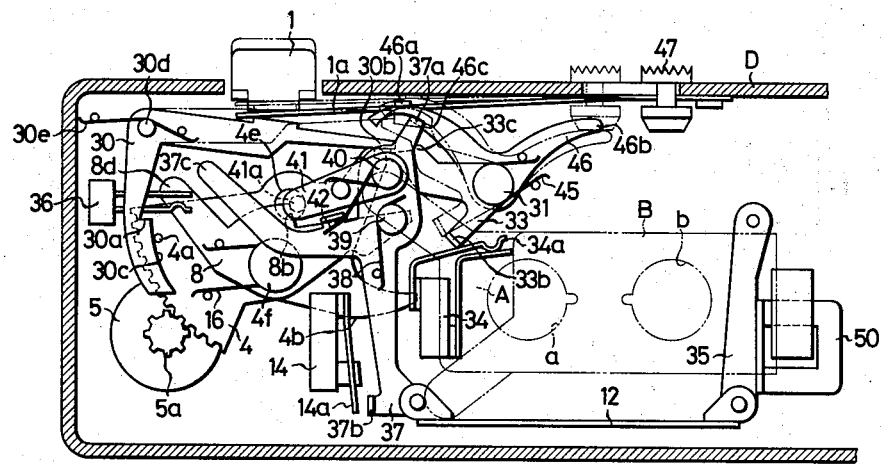
FIG. 15 is a front view showing the principal part of another embodiment of this invention.
Figure 16:
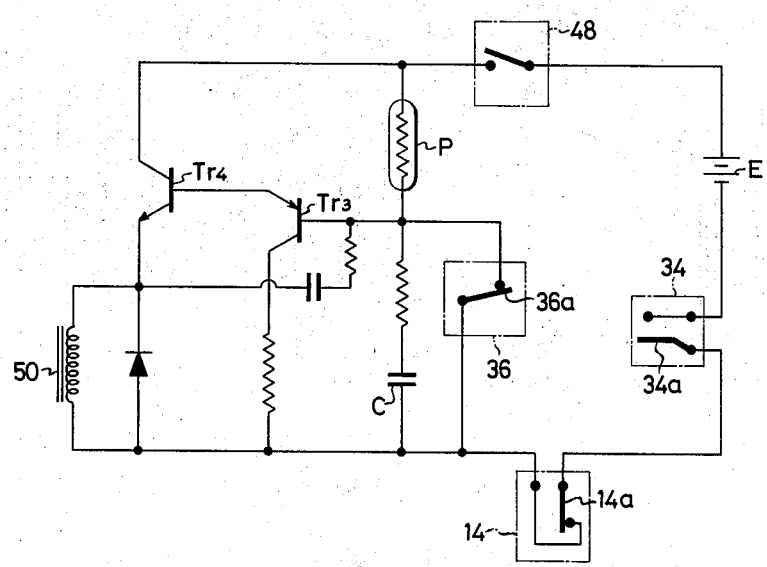
FIG. 16 is a diagram showing an example of exposure control electric circuit for the apparatus of FIG. 15.

FIG. 15 shows the embodiment of FIG. 10 which has been so modified that to prevent the consumption of the power source battery in making a bulb exposure, the exposure can be effected by a mechanical action with the electromagnet 50 held unenergized. The electrical circuit for this embodiment is shown in FIG. 16. This embodiment includes a bulb changeover lever 46 supported on the pin 31 for the switch lever 33 and having a coupling arm 46a biased in a counterclockwise direction by a spring 45 and engaged with the top face of the elastic plate 1a supporting the shutter button 1.

The bulb changeover lever 46 has another arm 46b adapted for engagement with or disengagement from a bulb changeover button 47 slidably supported on the camera body D. When the button 47 is in engagement with the arm 46b as shown in the phantom line in FIG. 15, the lever is prevented from counterclockwise rotation against the action of the spring 45, whereas if the button 47 is moved rightward out of engagement with the arm 46b, the lever follows the elastic plate 1a to rotate in a counterclockwise direction under the action of the spring 45 when the shutter button 1 is depressed, whereby a notched stepped portion 46c formed in the coupling arm 46a is brought into engagement with the lug 37a of the actuating lever 37. Consequently, in spite of the counterclockwise rotation of the switch lever 33 depressed by the elastic plate 1a, the actuating lever 37 is prevented from clockwise rotation and remains in this position during the depression of the shutter button 1.

The electric circuit includes a bulb changeover switch 48 which is closed while the bulb changeover button 47 is holding the lever 46 against counterclockwise rotation and which is opened when the button 47 is moved rightward to render the changeover lever 46 rotatable in a counterclockwise direction or when the lever 46 is initiated into counterclockwise rotation.

For the usual photographing operations (maing high, medium and low speed exposures by using an electronic shutter), the bulb changeover lever 46 is locked by a bulb changeover button 47 against counterclockwise rotation, whereby high speed, medium speed and low speed exposures can be made in the same manner as in the case of FIGS. 10 to 14.

If the bulb changeover button 47 is moved rightward from the locked position indicated in the phantom line in FIG. 15, the bulb changeover switch 48 is turned off, the lever being rendered rotatable in a counterclockwise direction under the action of the spring 45.

Depression of the shutter button 1 causes the release lever 30 to initiate the sector gear 4 into rotation and the switch lever 33 to rotate in a counterclockwise direction, permitting the projection 33c to disengage the lug 37a of the actuating lever 37.

Inasmuch as the bulb changeover switch 48 is off and the electromagnet 50 is unenergized, the actuating lever 37 would rotate in a clockwise direction under the action of the spring 38, but the bulb changeover lever 46 has already rotated in a counterclockwise direction following the depression of the shutter button 1 to engage the lug 37a by the notched stepped portion 46c. The actuating lever is therefore prevented from the clockwise rotation.

After the rotation of the sector gear 4 has opened the sectors to the full extent to make the desired exposure, the shutter button is relieved of the depressing pressure, whereupon the elastic plate 1a pushes the shutter button 1 upward and at the same time drives the bulb changeover lever 46 by engagement with the coupling arm 48a against the spring 45, disengaging the notched stepped portion 46c from the lug 37a. Consequently, the actuating lever 37 rotates in a clockwise direction under the action of the spring 38, actuating the sector driving lever 8 by the latch lever 41 to complete the exposure as already described.

The shutter is cocked exactly in the same manner as in FIG. 10.

The present invention provides an electronic shutter of the slow opening type utilizing the slow motion of the sector gear 4 under the control of the governot 5. The invention also provides a compact electronic shutter of the program type in which the size of the exposure opening is varied by the sector opening and closing lever 9 in corresponding relation to the displacement of the sector gear 4.

Of course, the present invention is not limited to the construction in which the displacement of the sector gear 4, serving as a movable member, is controlled only by the delaying means described in the embodiments. For example, it is possible to employ a construction in which the movable member is shifted to a predetermined position manually, or a construction in which the movable member is shifted in operative relation to the amount of deflection of the pointer of exposure meter. Thus any desired means can be employed whether automatic or manual. Such modifications in design are all included within the scope of this invention unless they depart from the basic disclosure of this invention.

What is claimed is:

1. In a camera including a camera body and a shutter sector movable between open and closed positions, a shutter operating apparatus comprising:
   means for opening and closing said sector, including a sector actuator member in driving association with said sector;
   a pivotally mounted setting member rotatable between a spring loaded cocked position and a discharge position;
   means for driving said sector actuator member, including a driving member pivotally mounted on said setting member and rotatable between a spring cocked position and a discharge position;

selectively actuatable means releasably locking said setting member in its cocked position;

means including a latch member for releasably locking said driving member in its cocked position and actuatable to release said driving member a variable time interval following the release of said setting member; and means for cocking said setting and driving members, including a cocking member movable along a predetermined path into sequential cocking engagement with said setting member and said driving member.

2. The apparatus as set forth in claim 1 the setting member comprises a rotatable member pivoted to the camera body and biased in one direction, the setting member supporting the driving member eccentrically of the center of rotation of the rotatable member and the setting member is initiated into movement simultaneously with the shutter release action to shift the driving member.

3. The apparatus as set forth in claim 1 further comprising:

braking means for limiting the rate of discharge movement of the setting member upon release therefrom from its cocked position to thereby vary the degree of the engagement of the sector driving member with the sector actuating member, an exposure time control circuit including and responsive to a light measuring integration circuit, an electromagnet energized in response to the control circuit and a latch actuating member movable to shift said latch member to release the driving member from the cocked position under the control of the electromagnet.

4. The apparatus as set forth in claim 3 wherein the setting member has a cam and said actuator has a follower movable into engagement with said cam to control the amount of opening movement of the sector actuator member, the amount of opening of the sectors corresponding to the amount of the actuator member movement.

5. The apparatus as set forth in claim 3 wherein the latch member latches the driving member at the position of the center of rotation of the setting member upon the shutter cocking action.

6. The apparatus as set forth in claim 3, said driving member being so shaped that after the actuating member has been initiated into movement it is prevented from returning by the driving member until the shutter cocking action and is returned to the original position upon completion of the shutter cocking operation.

7. The apparatus as set forth in claim 3 further comprising:

a pivotally mounted sector opening lever engageable and swingable by the setting member at a predetermined portion of the path of movement of the setting member, and a member resiliently connecting the sector actuator member to the opening lever to cause the sector actuator member to follow the swinging movement of the lever.

8. The apparatus as set forth in claim 7 wherein the exposure time control circuit includes a changeover switch for switching the energizing circuit of the electromagnet to an energizing circuit for a bulb exposure.

9. The apparatus as set forth in claim 3 wherein the electromagnet is energized upon a lapse of time responsive to the time constant of the light measuring integration circuit to cause the latch actuating member to retract the latch member and release the driving member into movement.

10. The apparatus as set forth in claim 3 wherein the electromagnet is energized upon actuation of the exposure control circuit and deenergized upon a lapse of time responsive to the time constant of the light measuring integration circuit to cause the latch actuating member to retract the latch member and release the driving member into movement.

11. The apparatus as set forth in claim 10 further comprising:

a release member responsive to the shutter release action to free the setting member from its cocked position, the release member being prevented from returning by the setting member after the release action until the shutter is cocked, said control circuit including a main energizing switch and a switch lever disposed in operative relation to the release member, the switch lever being operative to retain the latch actuating member at its cocked position upon the shutter cocking action and to close said main switch of the exposure control circuit and free the actuating member for operation upon the shutter release action.

12. The apparatus as set forth in claim 11 wherein the latch actuating member comprises a portion engageable with the cocking member by the shutter cocking action to be pushed to its cocked position for engagement with the switch lever and another portion operable to follow said portion and to latch the driving member at its cocked position at the end of the shutter cocking operation.

13. The apparatus as set forth in claim 11 further comprising:

a member movable operable by the shutter release action, a bulb changeover button having an operating portion exposed from the camera body and supported on the camera body so as to be manually shiftable, and a bulb changeover lever having a portion engageable with and disengageable from the changeover button and another portion engageable with and disengageable from the actuating member, the lever being so urged as to follow said member operable by the shutter release action, the lever being prevented from the following movement and from the engagement with the actuating member when in engagement with the changeover button, the lever being operable for the following movement when out of engagement with the changeover button to engage with the actuating member and to thereby prevent the movement thereof at the initial stage of the shutter release action, the lever being movable to follow the return of the shutter button and to release the actuating member into movement.

14. A shutter operating apparatus for a camera including a shutter sector movable between open and closed positions, comprising:

means for opening and closing said sector including a swingable mounted sector actuator member, in driving association with said sector means for driving said sector actuator including a spring loaded sector driving member movable in a forward direction by a shutter release action and in an opposite backward direction by a shutter cocking action and means releasably retaining said driving member in its spring loaded cocked position, the driving member being engageable with the sector actuator member during the forward movement to swing said sector actuator member, and a setting member swingably supporting the driving member for movement therewith, the setting member being movable prior to the movement of the driving member to shift the driving member to a position where the driving member is engageable with the sector actuator member, the setting member having means including a cam for controlling the amount of sector opening movement of the sector actuator member in corresponding relation to the amount of its movement to make the amount of opening of the sector correspond to the amount of the movement of the setting member.

* * * * *